(12) United States Patent
Yonemura (10) Patent No.: US 10,379,410 B2
(45) Date of Patent: Aug. 13, 2019

(54) LIQUID CRYSTAL DISPLAY APPARATUS

(71) Applicant: Mitsubishi Electric Corporation, Tokyo (JP)

(72) Inventor: Koji Yonemura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/703,784

(22) Filed: Sep. 13, 2017

(65) Prior Publication Data

US 2018/0004029 A1 Jan. 4, 2018

Related U.S. Application Data

(62) Division of application No. 14/601,713, filed on Jan. 21, 2015, now abandoned.

(30) Foreign Application Priority Data

Feb. 13, 2014 (JP) ................. 2014-024992

(51) Int. Cl.
  *G02F 1/1343* (2006.01)
  *G02F 1/1337* (2006.01)
(52) U.S. Cl.
  CPC .... *G02F 1/13439* (2013.01); *G02F 1/133707* (2013.01); *G02F 1/133703* (2013.01); *G02F 2001/134372* (2013.01); *G02F 2201/52* (2013.01)

(58) Field of Classification Search
  CPC ................................. G02F 1/133514
  See application file for complete search history.

(56) References Cited

U.S. PATENT DOCUMENTS

| | | | |
|---|---|---|---|
| 7,554,640 B2 | 6/2009 | Ono | |
| 8,035,778 B2 | 10/2011 | Chan et al. | |
| 2008/0143897 A1 | 6/2008 | Chang | |
| 2009/0102769 A1 | 4/2009 | Kouno et al. | |
| 2013/0135845 A1 | 5/2013 | Matsui et al. | |

FOREIGN PATENT DOCUMENTS

| | | |
|---|---|---|
| JP | H11-295717 A | 10/1999 |
| JP | 2004-004822 A | 1/2004 |
| JP | 2005-309052 A | 11/2005 |

OTHER PUBLICATIONS

An Office Action; "Notification of Reasons for Refusal," issued by the Japanese Patent Office dated Oct. 3, 2017, which corresponds to Japanese Patent Application No. 2014-024992 and is related to U.S. Appl. No. 15/703,784; with English language translation.

*Primary Examiner* — Richard H Kim
(74) *Attorney, Agent, or Firm* — Studebaker & Brackett PC (57) ABSTRACT

A liquid crystal display apparatus that controls liquid crystals with a pixel structure having a red pixel, a green pixel, a blue pixel, and a white pixel as a basic unit. Voltage-transmittance characteristics of the liquid crystals corresponding to the white pixel are different from voltage-transmittance characteristics of the liquid crystals corresponding to each of the red pixel, the green pixel, and the blue pixel.

7 Claims, 6 Drawing Sheets

LIQUID CRYSTAL DISPLAY APPARATUS

BACKGROUND OF THE INVENTION

Field of the Invention

The present invention relates to a liquid crystal display apparatus.

Description of the Background Art

Liquid crystal panels of liquid crystal display apparatuses for mobile use such as smart phones are required to have low power consumption capable of withstanding long-time use. For point of sale (POS) use that is used outside, the liquid crystal panels are required to have enhanced brightness for improving visibility.

To achieve the characteristics (low power consumption and enhanced brightness), liquid crystal display panels in which four pixels as one picture element are on display instead of three pixels as one picture element on display have been developed and, in fact, have been commercially available. The three pixels (hereinafter also referred to as RGB pixels) are red (R), green (G), and blue (B), which are the conventional three primary colors. The four pixels (hereinafter also referred to as RGBW pixels) are white (W) in addition to the three primary colors.

For display by the RGB pixels, a chromaticity (color temperature) of a white display is formed by additive color mixture of light that has passed through a color filter corresponding to each of the pixels of red, green, and blue. Meanwhile, for display by the RGBW pixels, a chromaticity of a white display is formed by additive color mixture of light that has passed through a color filter corresponding to each of the pixels of red, green, and blue and light that has passed through a translucent filter (in other words, transmittance has no wavelength dependence) corresponding to the white pixel.

As described above, the chromaticity of the white display formed by the RGB pixels does not typically coincide with the chromaticity of the white display formed by the RGBW pixels. Thus, if the RGB pixels are changed to the RGBW pixels for improving the transmittance, the chromaticity of the white display by the RGBW pixels is different from the chromaticity of the white display by the RGB pixels (shift in the chromaticity of the white display).

To obtain a desired chromaticity of the white display by the RGBW pixels, a filter corresponding to the white pixel has conventionally been used and is made of a special material having different light absorption coefficients between a long wavelength side and a short wavelength side in a visible region (for example, see Japanese Patent Application Laid-Open No. 11-295717 (1999)).

Moreover, in a liquid crystal display apparatus that has the RGBW pixels as the one picture element (basic unit) and is driven in a fringe field switch (FFS) mode, slits corresponding to the white pixel are disposed symmetrically with respect to slits corresponding to the red pixel, the green pixel and the blue pixel (for example, see Japanese Patent Application Laid-Open No. 2005-309052).

In Japanese Patent Application Laid-Open No. 11-295717 (1999), the special material forming the filter needs development, thereby requiring a cost of the development.

Japanese Patent Application Laid-Open No. 2005-309052 discloses a configuration for preventing a color shift in a range of viewing angles, namely, a tint from an oblique view. The configuration does not achieve the effect of matching the chromaticity of the white display formed by the RGB pixels with the chromaticity of the white display formed by the RGBW pixels.

In this manner, the change from the RGB pixels to the RGBW pixels could not have resolved the shift in the chromaticity of the white display.

SUMMARY OF THE INVENTION

It is an object of the present invention to provide a liquid crystal display apparatus capable of resolving a shift in a chromaticity of a white display to obtain a desired chromaticity of the white display by RGBW pixels.

A liquid crystal display apparatus that controls liquid crystals with a pixel structure having a red pixel, a green pixel, a blue pixel, and a white pixel as a basic unit. Voltage-transmittance characteristics of the liquid crystals corresponding to the white pixel are different from voltage-transmittance characteristics of the liquid crystals corresponding to each of the red pixel, the green pixel, and the blue pixel.

The present invention is the liquid crystal display apparatus that controls the liquid crystals with the pixel structure having the red pixel, the green pixel, the blue pixel, and the white pixel as the basic unit. The voltage-transmittance characteristics of the liquid crystals corresponding to the white pixel are different from the voltage-transmittance characteristics of the liquid crystals corresponding to each of the red pixel, the green pixel, and the blue pixel. Thus, the liquid crystal display apparatus can resolve the shift in the chromaticity of the white display to obtain the desired chromaticity of the white display.

These and other objects, features, aspects and advantages of the present invention will become more apparent from the following detailed description of the present invention when taken in conjunction with the accompanying drawings.

DESCRIPTION OF THE PREFERRED EMBODIMENTS

Preferred embodiments of the present invention will be described below with reference to the drawings.

First Preferred Embodiment

Figure 1:
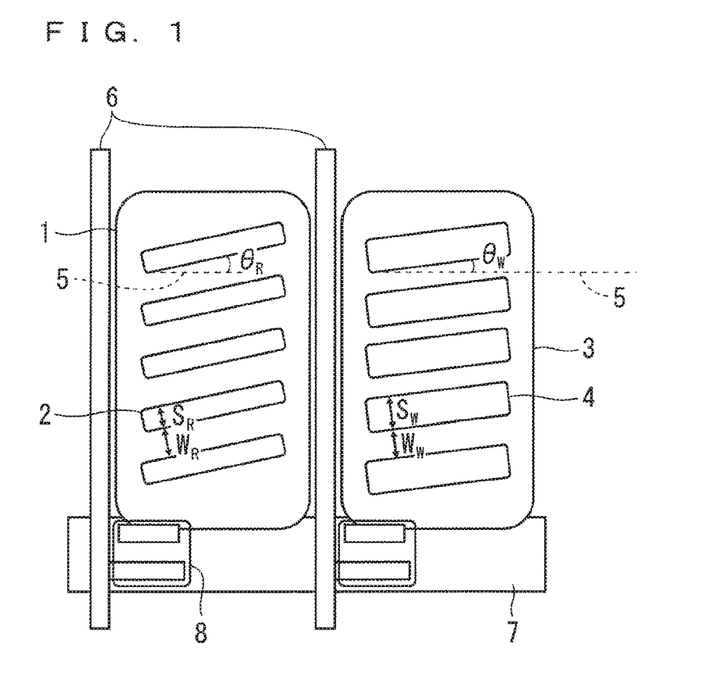
FIG. 1 is a diagram showing an example of a configuration of each pixel in a liquid crystal display apparatus according to a first preferred embodiment of the present invention.

FIG. 1 is a diagram showing an example of a configuration of each pixel in a liquid crystal display apparatus according to a first preferred embodiment of the present invention. FIG. 1 shows the liquid crystal display apparatus that controls liquid crystals with a pixel structure having RGBW pixels as one picture element (basic unit). The liquid crystal display apparatus is driven in an FFS mode in which a fringe electric field changes an alignment of the liquid crystals.

As shown in FIG. 1, a red slit electrode 1 and a white slit electrode 3 are provided on a thin film transistor (TFT) substrate including a TFT 8 connected to a source wire 6 and a gate wire 7 thereon.

The red slit electrode 1 is provided correspondingly to a red pixel and has a plurality of slits 2 so as to have a line width $W_R$ and a space $S_R$. In other words, each of the slits 2 has a length in a short-side direction that corresponds to the space $S_R$, and the slits 2 have an interval formed therebetween that corresponds to the line width $W_R$. In this manner, the red slit electrode 1 has the plurality of slits 2 that generate the fringe electric field upon voltage application.

Each of the slits 2 is formed to have an angle of $\theta_R$ between a long-side direction of each of the slits 2 and an alignment axis 5 of the liquid crystals (not shown).

The white slit electrode 3 is provided correspondingly to a white pixel and has a plurality of slits 4 so as to have a line width $W_W$ and a space $S_W$. In other words, each of the slits 4 has a length in a short-side direction that corresponds to the space $S_W$, and the slits 4 have an interval formed therebetween that corresponds to the line width $W_W$. In this manner, the white slit electrode 3 has the plurality of slits 4 that generate the fringe electric field upon voltage application.

Each of the slits 4 is formed to have an angle of $\theta_W$ between a long-side direction of each of the slits 4 and an alignment axis 5 of the liquid crystals (not shown).

In the configuration described above, the angle $\theta_R$ of the slit 2 formed in the red slit electrode 1 is different from the angle $\theta_W$ of the slit 4 formed in the white slit electrode 3.

A line width $W_R$/space $S_R$ ratio (ratio of an arrangement space of each slit to a length of each slit in a short-side direction) in the red slit electrode 1 is different from a line width $W_W$/space $S_W$ ratio in the white slit electrode 3.

In addition, a green slit electrode (not shown) provided correspondingly to a green pixel and a blue slit electrode (not shown) provided correspondingly to a blue pixel are also provided on the TFT substrate similarly to the red slit electrode 1 shown in FIG. 1. In fact, the red pixel, the green pixel, the blue pixel, and the white pixel are arranged in a horizontal direction of a paper shown in FIG. 1.

Hereinafter, the red slit electrode 1, the white slit electrode 3, and the like are collectively and simply referred to as a slit electrode. The angle $\theta_R$, the angle $\theta_W$, and the like are collectively and simply referred to as an angle $\theta$. The same holds true for the line width $W_R$, the line width $W_W$, the space $S_R$, and the space $S_W$, and the like.

The liquid crystal display apparatus driven in the FFS mode has two broad types of configurations of the pixels. In other words, the one type includes an pixel electrode that is connected to a TFT and disposed as an upper layer and a common electrode that is supplied with a common potential and disposed as a lower layer, and the other type includes the common electrode disposed as the upper layer and the pixel electrode disposed as the lower layer. In the first preferred embodiment, any of the types described above may include an electrode disposed as the upper layer having a configuration similar to that of the slit electrode shown in FIG. 1.

In the liquid crystal display apparatus driven in the FFS mode, to prevent a color shift in a range of viewing angles, the slit electrodes having a symmetric shape are conceivably disposed with respect to a symmetric axis that is a boundary dividing each pixel horizontally into two at the center. Also in this case, each of the slit electrodes disposed vertically may have a configuration similar to that of the slit electrode shown in FIG. 1.

Figure 2:
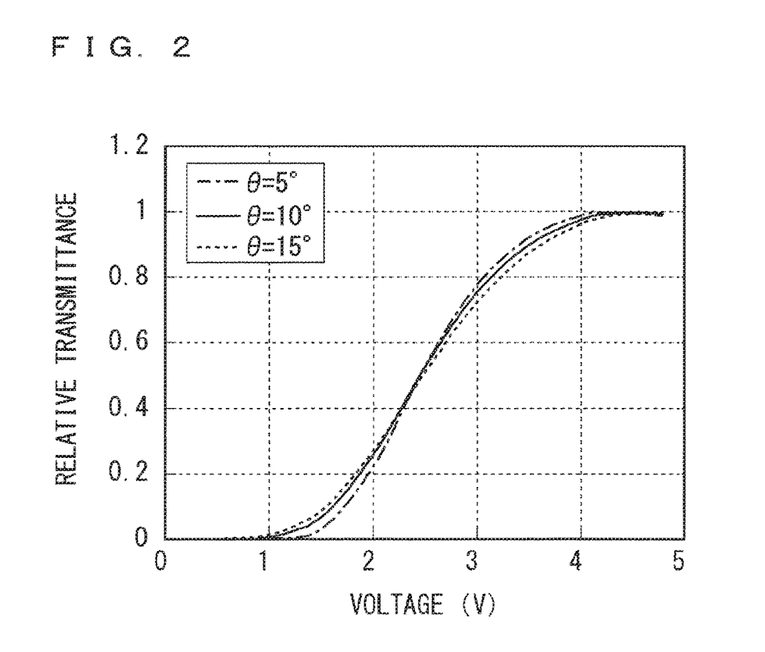
FIG. 2 is a diagram showing an example of voltage-transmittance characteristics of liquid crystals in a case where an angle of slits of slit electrodes is changed according to the first preferred embodiment of the present invention.

FIG. 2 is a diagram showing an example of voltage-transmittance characteristics of the liquid crystals in a case where the angle of slits of the slit electrode is changed.

In FIG. 2, the horizontal axis represents a voltage (V) applied between electrodes (at least one of them is the slit electrode) that are disposed to sandwich the liquid crystals, and the vertical axis represents a relative transmittance of the liquid crystals. FIG. 2 shows the voltage-transmittance characteristics in the cases where the angle $\theta$ is 5°, 10°, and 15°.

In the FFS mode, the voltage-transmittance characteristics (V-T characteristics) of the liquid crystals vary according to the angle $\theta$ and the line width W/space S ratio of the slit electrode.

As seen from FIG. 2, the voltage-transmittance characteristics are shifted to a lower voltage side as the angle $\theta$ is smaller.

Figure 3:
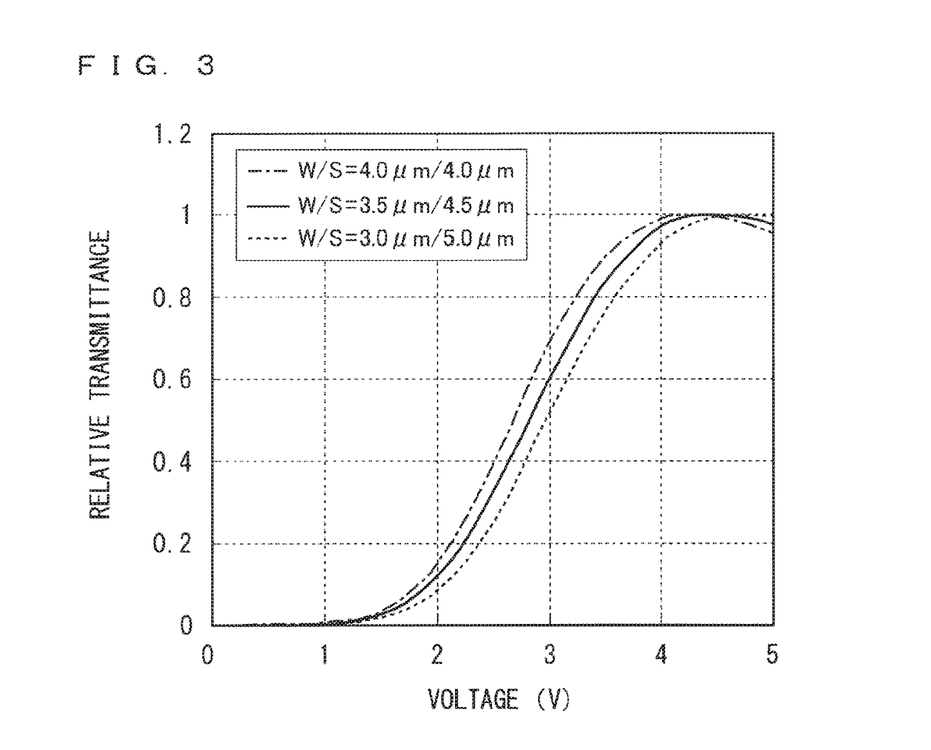
FIG. 3 is a diagram showing an example of the voltage-transmittance characteristics of the liquid crystals in a case where a line width/space ratio of the slit electrodes is changed according to the first preferred embodiment of the present invention.

FIG. 3 is a diagram showing an example of the voltage-transmittance characteristics of the liquid crystals in a case where the line width W/space S ratio of the slit electrode is changed.

In FIG. 3, the horizontal axis represents a voltage (V) having the maximum transmittance, and the vertical axis represents a relative transmittance of the liquid crystals. FIG. 3 shows the voltage-transmittance characteristics in the cases where the line width W/space S ratio is a 4.0 μm/4.0 μm ratio, a 3.5 μm/4.5 μm ratio, and a 3.0 μm/5.0 μm ratio.

The voltage-transmittance characteristics are also affected by the line width W/space S ratio of the slit electrode.

As seen from FIG. 3, the voltage-transmittance characteristics are shifted to a higher voltage side as the line width W/space S ratio is smaller.

Figure 4:
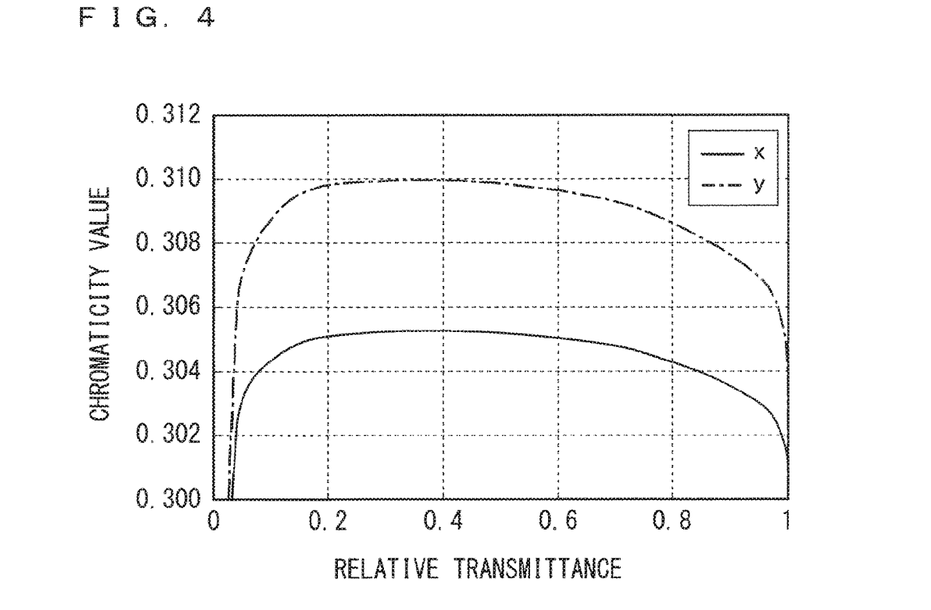
FIG. 4 is a diagram showing an example of a relationship between a relative transmittance and a chromaticity according to the first preferred embodiment of the present invention.

FIG. 4 is a diagram showing an example of a relationship between the relative transmittance and a chromaticity.

In FIG. 4, the horizontal axis represents the relative transmittance, and the vertical axis represents a chromaticity value.

As shown in FIG. 4, first, the chromaticity value increases according to an increase in the relative transmittance (chromaticity is shifted to a yellow side). Consequently, the chromaticity decreases according to a decrease in the relative transmittance (chromaticity is shifted to a blue side).

The chromaticity varies according to the relative transmittance as described above, so that the chromaticity can be controlled by changing the voltage-transmittance characteristics while the applied voltage is in the constant state.

Specifically, the change in the angle θ and the line width W/space S ratio of the slit electrode can change the voltage-transmittance characteristics as described above. Therefore, the voltage-transmittance characteristics can be controlled by the single white pixel with the change in the angle θ and the line width W/space S ratio of the slit electrode corresponding to the single white pixel, allowing for the change in the chromaticity of the light that passes through the liquid crystals corresponding to the white pixel. In other words, the voltage-transmittance characteristics of the liquid crystals corresponding to the white pixel are different from the voltage-transmittance characteristics of the liquid crystals corresponding to each of the red pixel, the green pixel, and the blue pixel.

In addition, FIG. 1 shows an example of the case of the change in both the angle θ and the line width W/space S ratio of the slit electrode, but the voltage-transmittance characteristics may be adjusted by changing only one of the angle θ and the line width W/space S ratio.

A description is given next of a method of matching (coinciding) the chromaticity of the white display formed by the RGB pixels with the chromaticity of the white display formed by the white pixel in the case where the RGBW pixels are assumed to be the one picture element (basic unit).

Figure 5:
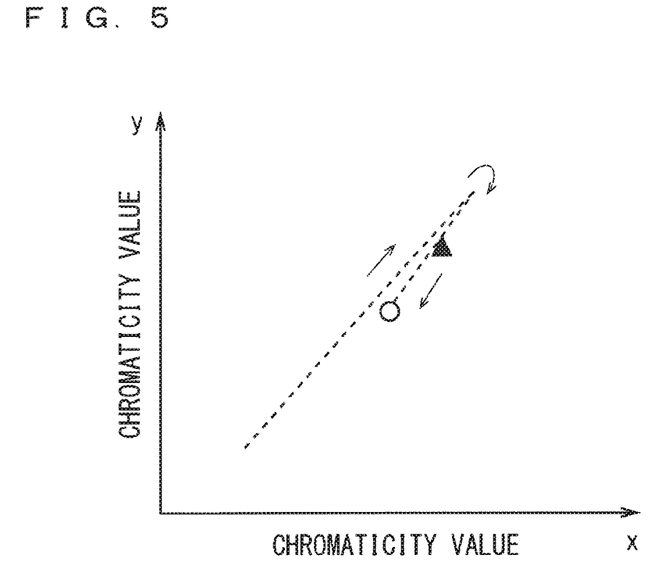
FIGS. 5 and 6 are diagrams showing an example for describing an adjustment to the chromaticity of a white display according to the first preferred embodiment of the present invention.
Figure 6:
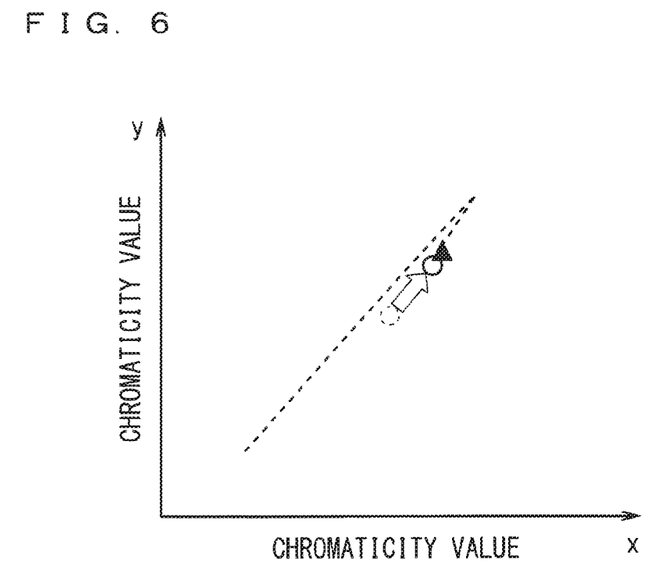

FIGS. 5 and 6 are diagrams showing an example for describing an adjustment to the chromaticity of the white display.

FIG. 5 shows a state before the adjustment to the chromaticity while FIG. 6 shows a state after the adjustment to the chromaticity. In FIGS. 5 and 6, a circle represents a chromaticity value of the white display formed by the white pixel, and a filled-in triangle represents a chromaticity value of the white display formed by the RGB pixels.

As shown in FIG. 5, the voltage is applied between the electrodes (at least one of them is the slit electrode) disposed to sandwich the liquid crystals, and thus the chromaticity is slightly shifted to the blue side after being shifted to the yellow side according to the increase in the relative transmittance (shifted along the broken line shown in FIG. 5). At this time, the chromaticity value of the white display formed by the white pixel is different from the chromaticity value of the white display formed by the RGB pixels. In the example of FIG. 5, the chromaticity of the white display formed by the white pixel is more bluish.

In the case above, the white slit electrode 3 has the greater angle $θ_W$ or has the greater space $S_W$ of the line width $W_W$/space $S_W$ ratio to shift the voltage-transmittance characteristics to the high voltage side, whereby the chromaticity value of the white display formed by the white pixel can be matched (coincided) with the chromaticity value of the white display formed by the RGB pixels (see FIG. 6).

Thus, the first preferred embodiment can resolve the shift in the chromaticity of the white display to obtain the desired chromaticity of the white display by the RGBW pixels.

Second Preferred Embodiment

Figure 7:
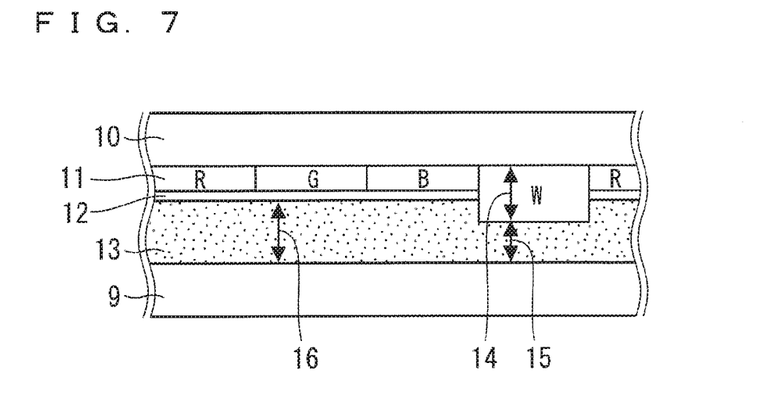
FIG. 7 is a cross-sectional view showing an example of a configuration of a liquid crystal display apparatus according to a second preferred embodiment of the present invention.

FIG. 7 is a cross-sectional view showing an example of a configuration of a liquid crystal display apparatus according to a second preferred embodiment of the present invention.

FIG. 7 shows the liquid crystal display apparatus that controls liquid crystals with a pixel structure having RGBW pixels as one picture element (basic unit). The liquid crystal display apparatus is driven in an FFS mode in which a fringe electric field changes an alignment of the liquid crystals.

As shown in FIG. 7, a TFT substrate 9 and a color filter (CF) substrate 10 are disposed to sandwich a liquid crystal layer 13.

A color filter 11 and an overcoat film 12 are laminated on the CF substrate 10.

The color filter 11 has a position corresponding to each of a red pixel, a green pixel, and a blue pixel colored by a corresponding color (color resist film).

The overcoat film 12 is transparent and is formed on the color filter 11 (on the liquid crystal layer 13 side).

The color filter 11 and the overcoat film 12 that are formed in the position corresponding to the white pixel are transparent and may use the same transparent resist film. FIG. 7 shows that they use the same transparent resist film.

As shown in FIG. 7, a cell gap 15 that is a thickness of the liquid crystal layer 13 corresponding to the white pixel is different in thickness from a cell gap 16 that is a thickness of the liquid crystal layer 13 corresponding to the red pixel, the green pixel, and the blue pixel.

Figure 8:
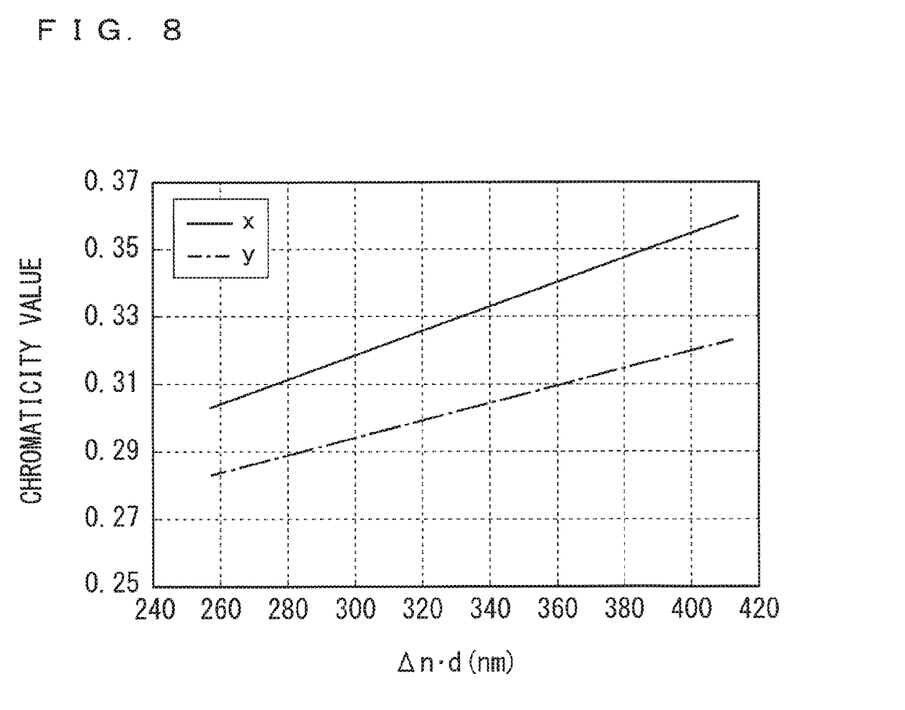
FIG. 8 is a diagram showing an example of a relationship between a retardation and a chromaticity of a liquid crystal layer according to the second preferred embodiment of the present invention.

FIG. 8 is a diagram showing an example of a relationship between a retardation and a chromaticity of the liquid crystal layer 13.

In FIG. 8, the horizontal axis represents the retardation Δn·d (nm), and the vertical axis represents a chromaticity value in a case where no light passes through the color filter 11.

In the liquid crystal display apparatus driven in the FFS mode, it is widely known that the retardation Δn·d (d and Δn represent the thickness and a refractive index anisotropy of the liquid crystal layer 13, respectively) of the liquid crystal cells changes a spectrum of light that passes through the liquid crystals.

As shown in FIG. 8, an increase in the retardation Δn·d (for example, increase in a cell gap) changes the chromaticity to a yellowish color while a decrease in the retardation Δn·d (for example, decrease in a cell gap) changes the chromaticity to a bluish color.

A description is given next of a method of matching (coinciding) the chromaticity of the white display formed by the RGB pixels with the chromaticity of the white display formed by the white pixel in a case where the RGBW pixels are assumed to be one picture element (basic unit).

Figure 9:
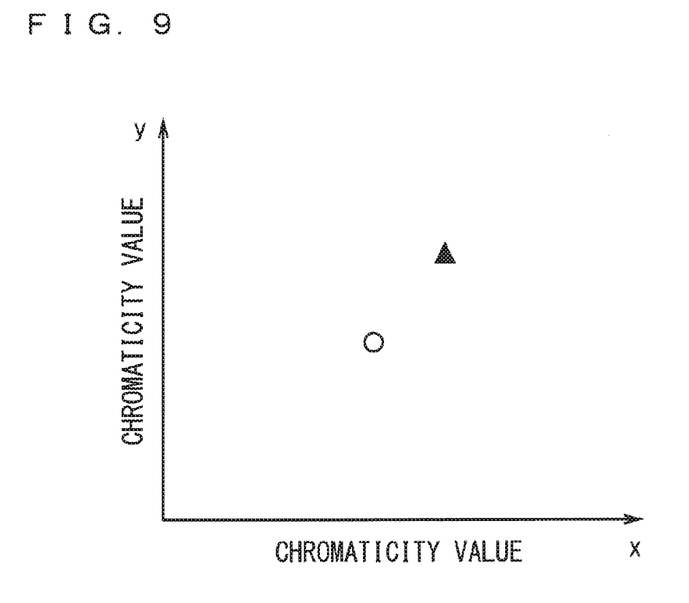
FIG. 9 is a diagram showing an example for describing an adjustment to the chromaticity of a white display according to the second preferred embodiment of the present invention.
Figure 10:
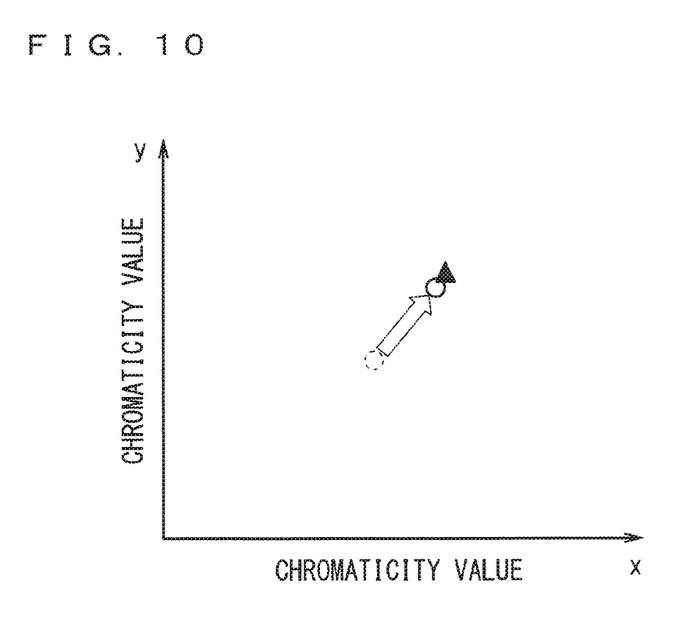
FIG. 10 is a diagram showing an example for describing the adjustment to the chromaticity of the white display according to the second preferred embodiment of the present invention.

FIGS. 9 and 10 are diagrams showing an example for describing an adjustment to the chromaticity of the white display.

FIG. 9 shows a state before the adjustment to the chromaticity while FIG. 6 shows a state after the adjustment to the chromaticity. In FIGS. 9 and 10, a circle represents a chromaticity value of the white display formed by the white pixel, and a filled-in triangle represents a chromaticity value of the white display formed by the RGB pixels.

As shown in FIG. 9, when the chromaticity of the white display formed by the RGB pixels is more yellowish than that of the white display formed by the white pixel, the chromaticity of the white display formed by the white pixel can be matched (coincided) with that of the white display formed by the RGB pixels (see FIG. 10) by increasing the cell gap (cell gap 15 in FIG. 7) corresponding to the white pixel and adjusting the spectrum of the light that passes through the liquid crystals corresponding to the white pixel. In other words, the retardation of the light that passes through the liquid crystals corresponding to the white pixel is different from the retardation of the light that passes through the liquid crystals corresponding to each of the red pixel, the green pixel, and the blue pixel.

To change the cell gap (cell gap 15 in FIG. 7) corresponding to the white pixel, a resist film thickness 14 corresponding to the white pixel is changed. In other words, the retardation of the light that passes through the liquid crystals corresponding to the white pixel varies according to the thickness of the resist film corresponding to the white pixel.

Thus, the second preferred embodiment similar to the first preferred embodiment can resolve the shift in the chromaticity of the white display to obtain the desired chromaticity of the white display by the RGBW pixels.

The first preferred embodiment may be applied to the second preferred embodiment. In this case, the range of adjustments to the chromaticity of the white display of the white pixel expands, allowing for fine adjustments as well.

Third Preferred Embodiment

Figure 11:
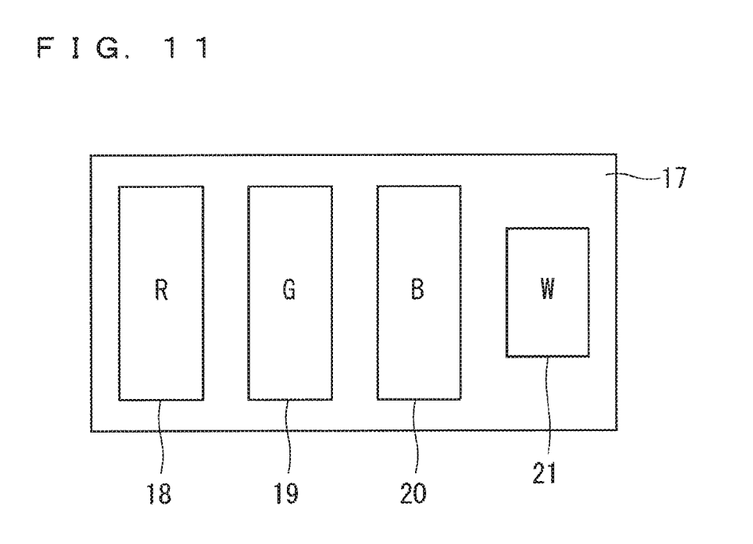
FIG. 11 is a diagram showing an example of a black matrix according to a third preferred embodiment of the present invention.

FIG. 11 is a diagram showing an example of a black matrix 17 according to a third preferred embodiment of the present invention.

The black matrix 17 (light shielding layer) is disposed on a CF substrate on a display surface side with respect to liquid crystals.

As shown in FIG. 11, the black matrix 17 has openings 18 to 21 formed correspondingly to a red pixel, a green pixel, a blue pixel, and a white pixel.

An area of the opening 21 corresponding to the white pixel is different from an area of each of the openings 18 to 20 corresponding to the red pixel, the green pixel, and the blue pixel.

An intensity of the light that passes through the liquid crystals (such as the liquid crystal layer 13 in FIG. 7) corresponding to the white pixel may be changed by adjusting the area of the opening 21. Therefore, the adjustment to the area of the opening 21 can make a mixture of the chromaticities of the white displays formed by the RGB pixels and formed by the white pixel to be a desired chromaticity.

Thus, the third preferred embodiment similar to the first preferred embodiment can resolve the shift in the chromaticity of the white display to obtain the desired chromaticity of the white display by the RGBW pixels.

The first preferred embodiment and the second preferred embodiment may be applied to the third preferred embodiment. In this case, the range of adjustments to the chromaticity of the white display of the white pixel expands, allowing for fine adjustments as well.

In addition, according to the present invention, the above preferred embodiments can be arbitrarily combined, or each preferred embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A method for providing liquid crystals with a pixel structure having a red pixel, a green pixel, a blue pixel, and a white pixel as a basic unit, the method comprising:
    forming, on a substrate, slit electrodes each of having a plurality of slits, each slit electrode corresponding to a respective one of said red pixel, said green pixel, and said blue pixel, such that said liquid crystals corresponding to each of said red pixel, said green pixel, and said blue pixel form a white display having a first chromaticity value; and
    forming, in said substrate, another slit electrode having a plurality of slits and corresponding to said white pixel, said liquid crystals corresponding to said white pixel having a chromaticity value that matches said first chromaticity value by said another slit electrode having a slit width, which is a length of each of said slits of said another slit electrode in a length direction, that is adjusted to change said chromaticity value of said liquid crystals corresponding to said white pixel.

2. The method according to claim 1, wherein
    the method is implemented in a fringe field switch (FFS) mode in which a fringe electric field changes an alignment of said liquid crystals,
    wherein said red pixel, said green pixel, said blue pixel, and said white pixel each include a slit electrode having a plurality of slits that generate said fringe electric field upon voltage application, and
    wherein the method comprises varying said voltage-transmittance characteristics according to an angle formed between an alignment axis of said liquid crystals and a long-side direction of each of said slits.

3. The method according to claim 2, comprising varying said voltage-transmittance characteristics according to a ratio of an arrangement space of each of said slits, which is a distance between each of said slits of said another slit electrode, to said slit width of each of said slits of said another slit electrode.

4. The method according to claim 1, comprising differentiating a retardation of light that passes through said liquid crystals corresponding to said white pixel from a retardation of light that passes through said liquid crystals corresponding to each of said red pixel, said green pixel, and said blue pixel.

5. The method according to claim 3,
    wherein a resist film is disposed on a display surface side with respect to said liquid crystals, and
    wherein the method comprises varying the retardation of the light that passes through said liquid crystals corresponding to said white pixel according to a thickness of said resist film corresponding to said white pixel.

6. The method according to claim 1,
    wherein a light shielding layer is disposed on a display surface side with respect to said liquid crystals,
    wherein said light shielding layer has openings formed correspondingly to said red pixel, said green pixel, said blue pixel, and said white pixel, and
    wherein the method comprises differentiating an area of said opening corresponding to said white pixel from an area of each of said openings corresponding to said red pixel, said green pixel, and said blue pixel.

7. The method according to claim 1, comprising adjusting said voltage-transmittance characteristics of said liquid crystals corresponding to said white pixel by at least one of a pixel electrode line width and a pixel electrode spacing to be different from voltage-transmittance characteristics of said liquid crystals corresponding to each of said red pixel, said green pixel, and said blue pixel.

* * * * *